United States Patent
Mori

(10) Patent No.: US 8,235,769 B2
(45) Date of Patent: Aug. 7, 2012

(54) ELECTRON-BEAM-ASSISTED EEM METHOD

(75) Inventor: Yuzo Mori, Katano (JP)

(73) Assignees: Yuzo Mori, Katano-shi, Osaka (JP); JTEC Corporation, Kobe-shi, Hyogo (JP)

(*) Notice: Subject to any disclaimer, the term of this patent is extended or adjusted under 35 U.S.C. 154(b) by 1219 days.

(21) Appl. No.: 11/989,960

(22) PCT Filed: Aug. 3, 2006

(86) PCT No.: PCT/JP2006/315388
§ 371 (c)(1),
(2), (4) Date: Feb. 4, 2008

(87) PCT Pub. No.: WO2007/018117
PCT Pub. Date: Feb. 15, 2007

(65) Prior Publication Data
US 2010/0221986 A1 Sep. 2, 2010

(30) Foreign Application Priority Data

Aug. 5, 2005 (JP) .................................. 2005-228587

(51) Int. Cl.
*B24B 49/00* (2006.01)
(52) U.S. Cl. ............... 451/37; 451/38; 451/39; 451/57; 451/908; 427/498; 205/640; 205/655; 216/87; 216/94
(58) Field of Classification Search ............. 451/1, 11, 451/28, 36, 37, 38, 39, 57, 908; 427/498; 205/640, 655; 216/87, 94, 95
See application file for complete search history.

(56) References Cited

U.S. PATENT DOCUMENTS

| | | | | |
|---|---|---|---|---|
| 4,924,490 A | * | 5/1990 | Hashimoto et al. | 378/145 |
| 5,122,388 A | * | 6/1992 | Hashimoto et al. | 427/498 |

FOREIGN PATENT DOCUMENTS

| | | |
|---|---|---|
| JP | 64-27852 | 1/1989 |
| JP | 7-1302 | 1/1995 |
| JP | 10-206612 | 8/1998 |
| JP | 2000-6007 | 1/2000 |
| JP | 2000-40828 | 2/2000 |
| JP | 2000-167770 | 6/2000 |
| JP | 2006-21295 | 1/2006 |
| JP | 2006-159379 | 6/2006 |

\* cited by examiner

*Primary Examiner* — Eileen P. Morgan
(74) *Attorney, Agent, or Firm* — Kratz, Quintos & Hanson, LLP

(57) ABSTRACT

To provide an electron beam assisted EEM method that can realize ultraprecision machining of workpieces, including glass ceramic materials, in which at least two component materials different from each other in machining speed in a machining process are present in a refined mixed state and the surface state is not even, to a surface roughness of 0.2 to 0.05 nm RMS. The EEM method comprises a working process in which a workpiece and chemically reactive fine particles are allowed to flow along the working face to remove atoms on the working face chemically bonded to the fine particles together with the fine particles through chemical interaction between the fine particles and the working face interface. The workpiece comprises at least two component materials present in a refined mixed state and different from each other in machining speed in the machining process. After the exposure of the workpiece in its working face to an electron beam to conduct modification so that the machining speed of the surface layer part in the working face is substantially even, ultraprecision smoothening is carried out by working process.

20 Claims, 9 Drawing Sheets

[Fig. 1]
(a)
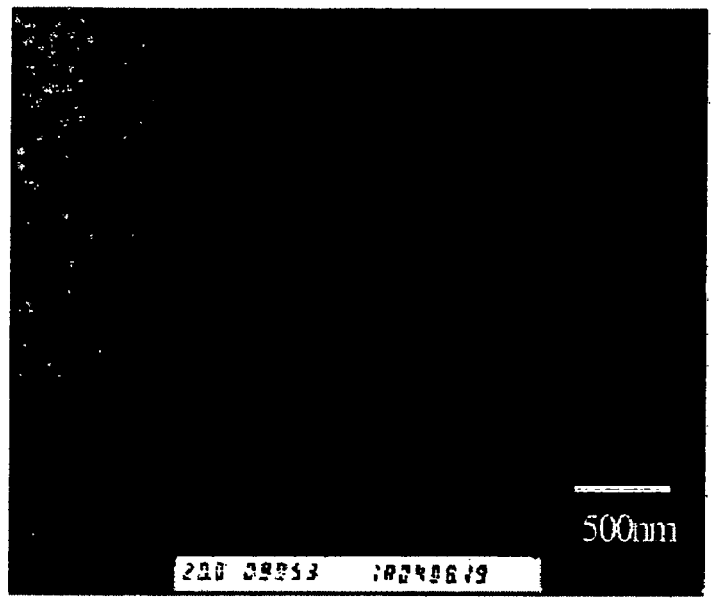
×20,000 TEM image (immediately after initiation of scanning)
(b)
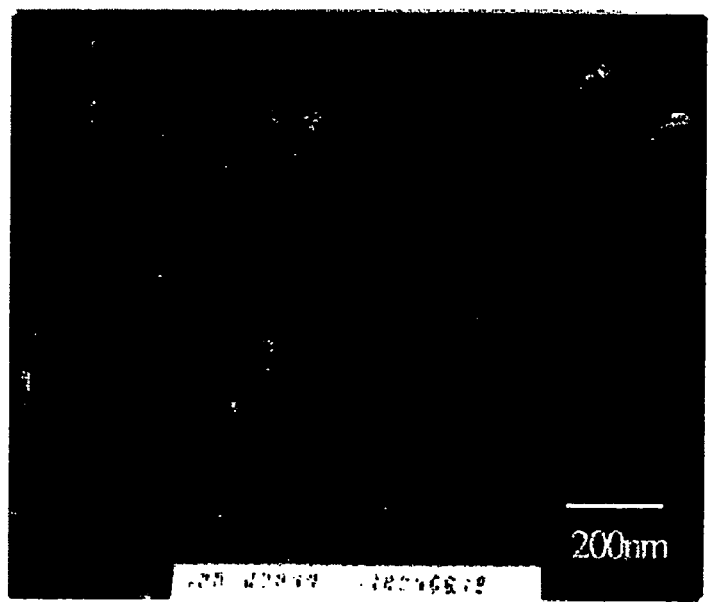
×50,000 TEM image (immediately after initiation of scanning)

[Fig. 2]
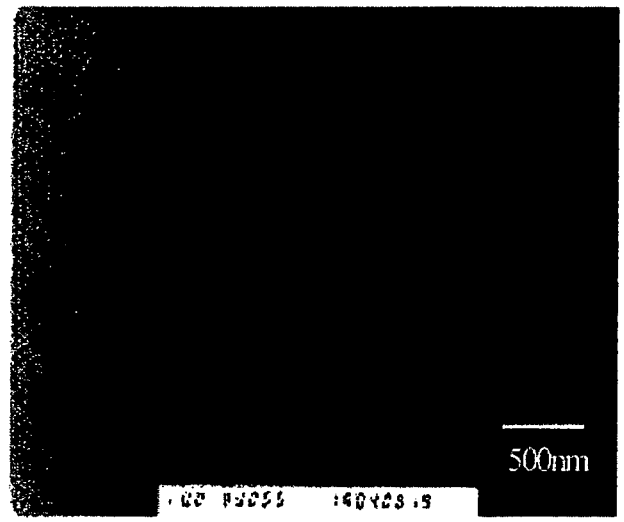
×20,000 TEM image
(1 minute after initiation of scanning)
[Fig. 3]
(a)                      (b)
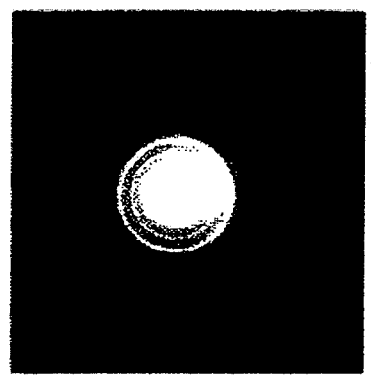 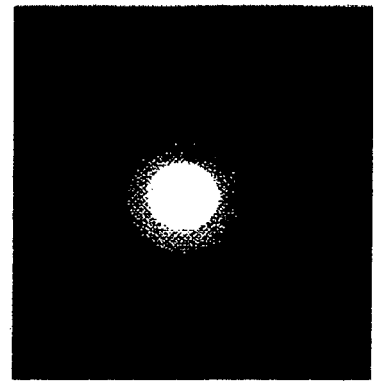
Diffraction pattern of white spot region in Figure 1      Diffraction pattern of the region other than white spot in Figure 1

[Fig. 4]
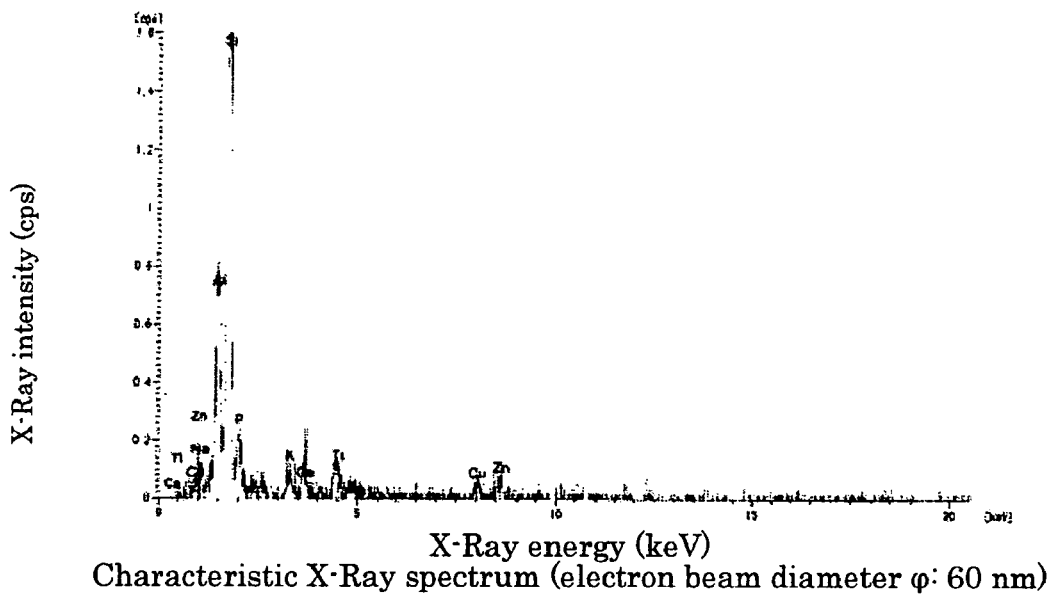
Characteristic X-Ray spectrum (electron beam diameter φ: 60 nm)

[Fig. 5]
(a)
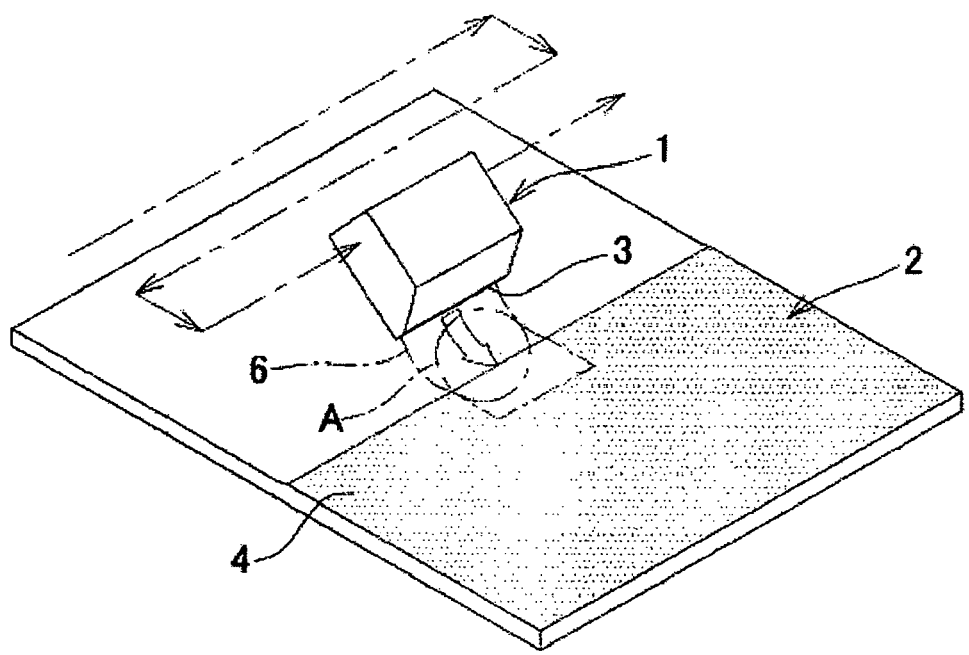
(b)
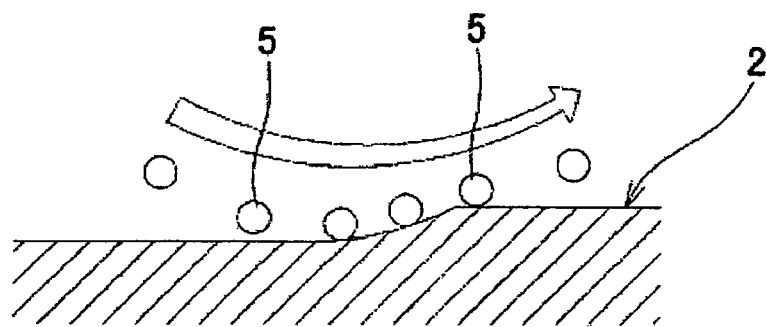

[Fig. 6]
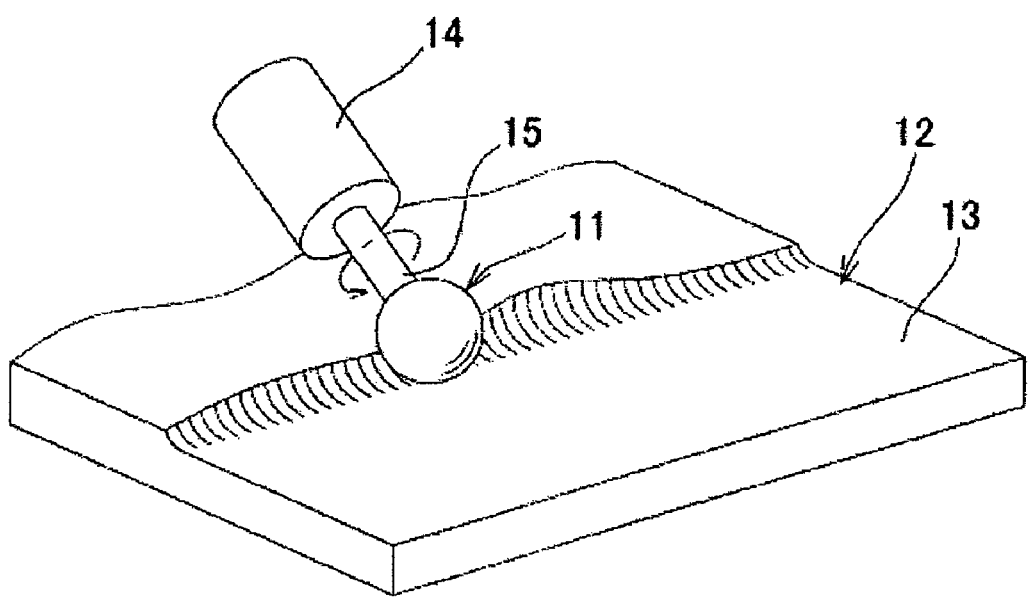

[Fig. 7]
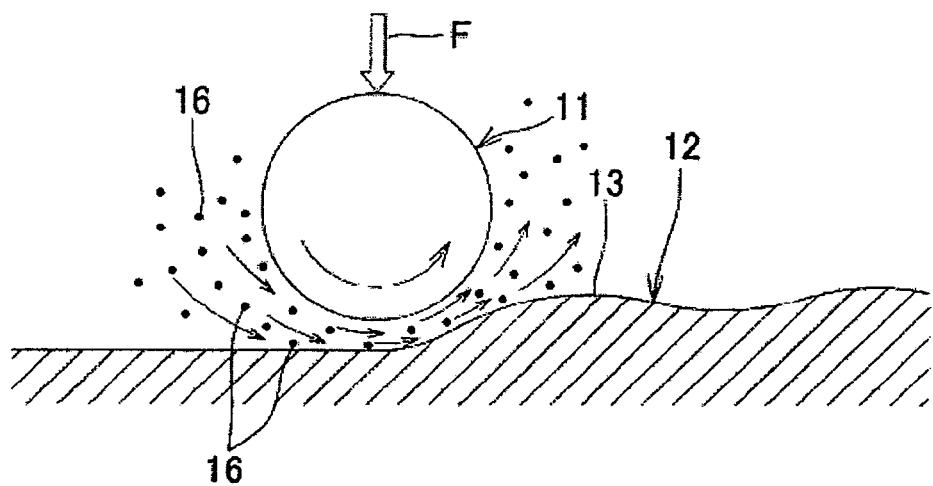
[Fig. 8]
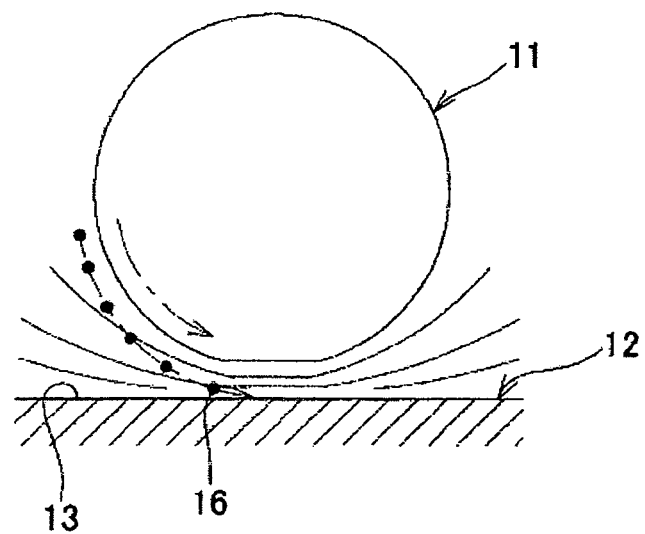

[Fig. 9]
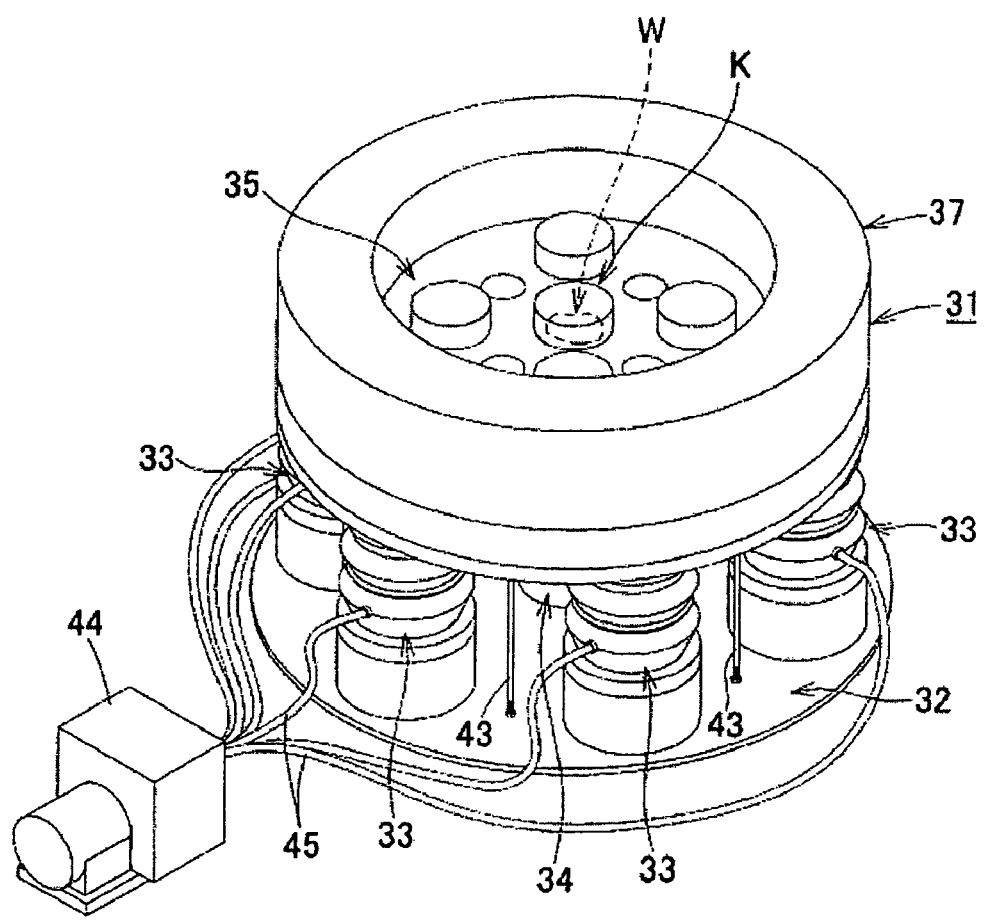

[Fig. 10]
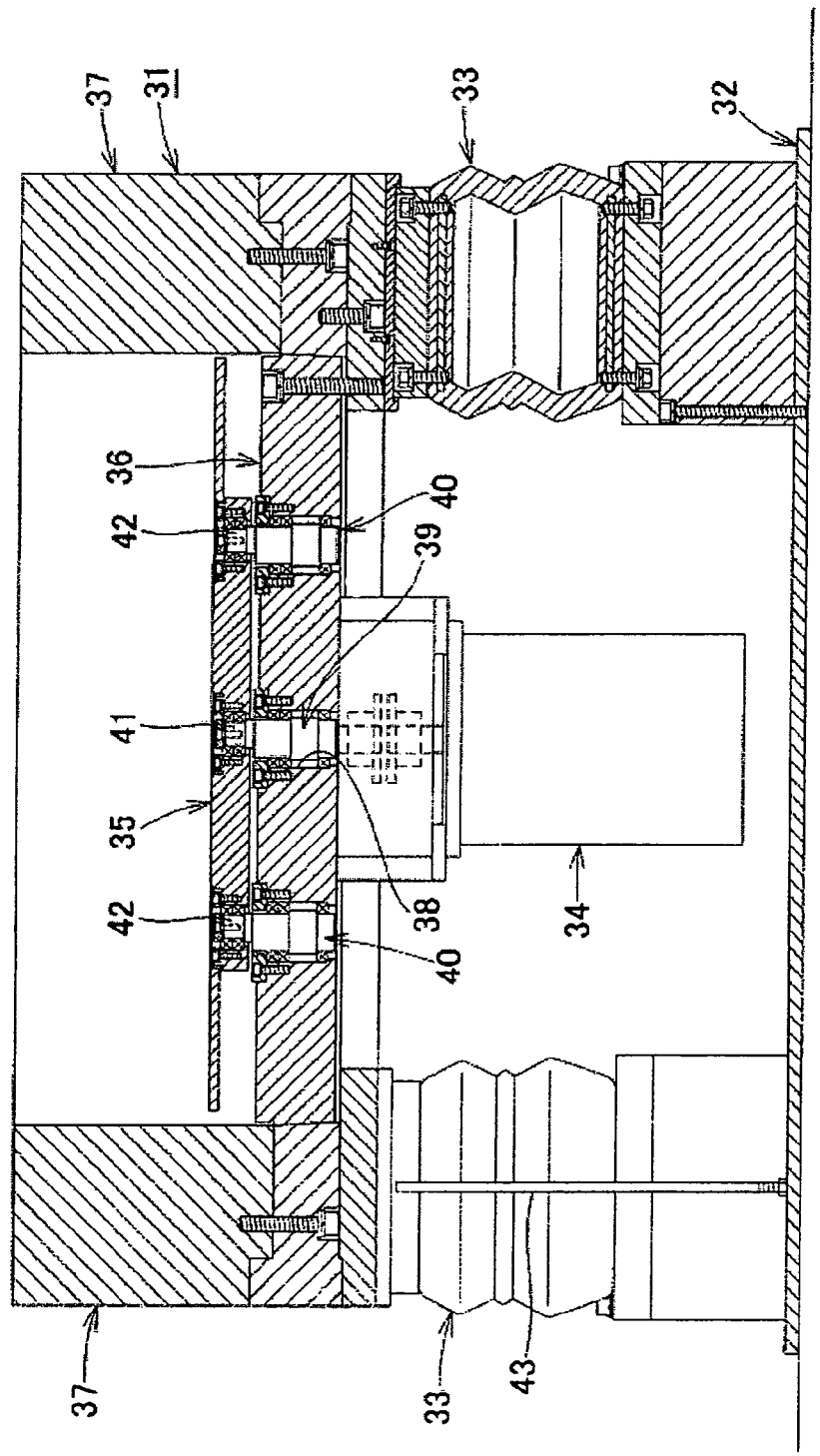

[Fig. 11]
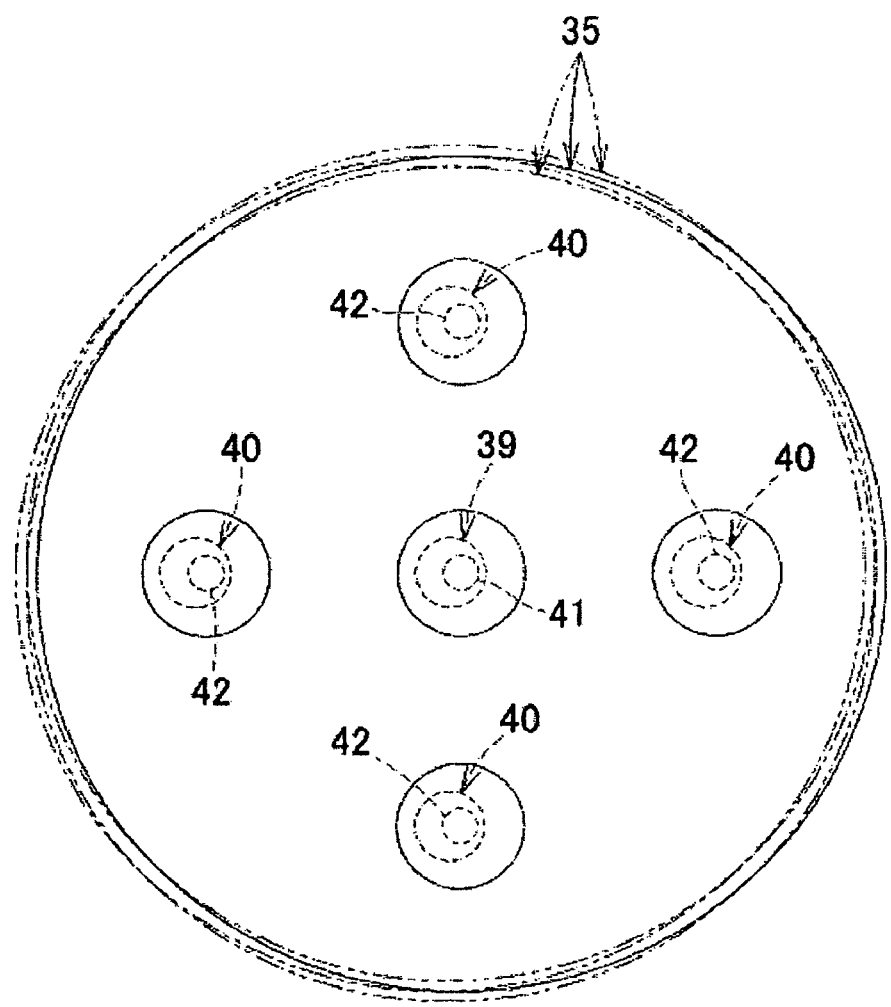

ELECTRON-BEAM-ASSISTED EEM METHOD

FIELD OF THE INVENTION

The present invention relates to an electron-beam-assisted EEM method, in particular to an electron-beam-assisted EEM method allowing ultrahigh-precision processing of a workpiece having a polycrystalline or microcrystalline surface.

BACKGROUND OF THE INVENTION

An ultrahigh-precision processing called EEM (Elastic Emission Machining) of finishing the surface of a workpiece by bringing fine particles into contact with the processing face of a workpiece under almost no load while making a processing liquid containing dispersed fine particles flow along the processing face thereof and removing the atoms on the processing face to the depth at the order of atom by the interaction (like chemical bonding) between the fine particles and the processing face was developed by the inventors and has been already known. It was possible to perform two-dimensional synthetic-mirror light condensation to the world-smallest condensation spot of 90 nm×180 nm on a 1-km beam line in a large-scale photoradiation facility (SPring-8), by using two X-ray elliptical mirrors prepared by final finishing of X-ray elliptical mirrors of silicon single crystal by using the EEM method. Currently, a processing precision allowing beam condensation into a further smaller spot is obtained.

Patent Document 1 discloses a polishing machine for processing the polishing surface of a workpiece by bringing a revolving elastic material closer to the polishing surface of a workpiece immersed in a processing liquid containing fine particles uniformly dispersed and allowing the processing liquid to flow between them, the polishing machine comprising a rotation drive mechanism of rotating the workpiece and a feed mechanism of adjusting the relative position of the rotation drive mechanism and the revolving elastic material in the direction perpendicular to the rotation axis of the rotation drive mechanism. The elastic rotor used is a ball or cylinder of polyurethane. Alternatively, Patent Document 2 discloses a processing machine allowing reliable processing of a workpiece by using the same processing principle.

Yet alternatively, Patent Document 3 proposes a processing method of advancing processing by placing a workpiece and a high-pressure nozzle at a particular distance in a processing tank mainly containing ultrapure water, generating high-speed shearing stream of ultrapure water by ejection from the high-pressure nozzle placed in the area close to the surface of the workpiece, supplying fine particles chemically reactive with the workpiece onto the workpiece surface in the ultrapure water stream, and thus, removing the workpiece surface atoms chemically bound to the workpiece with the fine particles ejected in the high speed shearing stream.

The EEM is a processing method using the phenomenon that, when fine particles having a particle diameter of 10 nm to 10 μm are used and the fine particles and the workpiece surface atoms are bound to each other by chemical interaction, the surface atoms bound to the fine particles have back bonds lowered in strength, and are also removed when the fine particles are removed from the workpiece surface. Because the fine particles are forced to flow along the surface of the workpiece in EEM, microprojections on the workpiece surface are removed selectively, giving a smoothened surface having a surface roughness of 0.1 nm RMS (Root mean square). Factors having a large influence on processability in EEM include the combination of workpiece and fine particles, the surface state of workpiece, the shape and form of fine particles, and the like. For ultrahigh-precision processing, the surface state of the workpiece should be uniform, and the properties of the fine particles are also desirably uniform.

However, although it is possible to perform ultrahigh-precision processing of uniform materials such as silicon single crystal, the surface roughness of the workpieces having irregular surface such as materials having both fine crystalline and non-crystalline regions may be increased to 1 nm RMS or more, on the contrary, in the EEM processing. For example, ZERODUR® (SCHOTT AG), which is superior in shape stability in a wide temperature range and thus has been used as a substrate for high-precision mirror for use in various optical systems, belongs to glass-ceramic composite materials (hereinafter, referred to as "glass ceramics") and contains both non-crystalline (amorphous) and crystalline compositions, and thus, if EEM is used directly for the processing of the material, it is quite difficult to achieve the surface smoothness at a surface roughness of 0.1 nm RMS or less, because the processing rate varies according to the crystal structure.

Patent Document 1: Japanese Examined Patent Publication No. 7-16870
Patent Document 2: Japanese Patent No. 3630987
Patent Document 3: Japanese Unexamined Patent Publication No. 2000-167770

DISCLOSURE OF THE INVENTION

Problems to be Solved by the Invention

An object of the present invention, which was made to solve the problems under the circumstances above, is to provide an electron-beam-assisted EEM method allowing ultrahigh-precision processing of workpieces containing a mixture of at least two kinds of pulverized component materials different in the processing rate in the processing process and having an irregular surface, such as glass ceramics material ZERODUR, to a surface roughness of 0.2 to 0.05 nm RMS.

Means to Solve the Problems

The inventors have made the present invention, based on the finding during observation of the ZERODUR surface under transmission electron microscope (TEM) that the ZERODUR surface loses its surface crystallinity gradually over time and becomes almost non-crystalline entirely, and that it is possible to perform ultrahigh-precision processing of materials uneven in surface crystallinity such as ZERODUR by EEM after electron beam irradiation by positively using the phenomenon above.

Accordingly, an aspect of the present invention, which was made to solve the problems above, is an electron-beam-assisted EEM method, characterized by including a processing process of allowing fine particles chemically reactive with a workpiece to flow along a processing face of the workpiece and removing the processing-face atoms chemically bound to the fine particles together with the fine particles by chemical interaction at the interface between the fine particles and the processing face, wherein: the workpiece includes a mixture of at least two kinds of pulverized component materials different in the processing rate by the processing process above from each other; and the processing face of the workpiece is irradiated with electron beam to be modified such that the processing rate is almost uniform on the surface layer region of the processing face and then superfine-smoothened by the processing process.

Another aspect is the electron-beam-assisted EEM method above, wherein the workpiece is a glass ceramic having one crystalline principal constituent material and the other non-crystalline principal constituent material, and the surface layer region of the processing face of the workpiece is non-crystallized uniformly by electron beam irradiation and processed in the following processing process to a processing face having a surface roughness of 0.2 to 0.05 nm RMS.

In the electron-beam-assisted EEM method above, the processing in the processing process is carried out by making a processing liquid containing fine particles dispersed in ultrapure water flow at high speed along the processing face of the workpiece.

Specifically in the electron-beam-assisted EEM method above, the processing is performed by generating a high-speed shear stream of the processing liquid along the area close to the processing face by ejecting the processing liquid through a processing nozzle from a tilted direction in liquid on the processing face of the workpiece immersed in ultrapure water or in the processing liquid and removing the processing-face atoms by removing the fine particles chemically bound to the processing-face atoms in the high-speed shear stream.

Alternatively, in the electron-beam-assisted EEM method above, the processing is performed by placing the workpiece and the elastic rotor in the processing liquid, incorporating the processing liquid into the space between the elastic rotor and the processing face and allowing the processing liquid to flow through the space by rotating the elastic rotor while pressing the processing rotor on the processing face of the workpiece at a particular load, and preserving the particular gap by control of the balance between the load and the dynamic fluid pressure generated by flow of the processing liquid.

Yet alternatively, the processing process is carried out by placing the workpiece with its processing face held horizontally in a processing container, housing water molecule-adsorbed fine particles in the processing container and placing the fine particles on the processing face, allowing the fine particles to flow on and become in contact with the processing face of the workpiece by vibrating the processing container two-dimensionally in the horizontal plane, and thus advancing mirror-surface processing by interaction at the interface between the fine particles and the processing face.

In particular, the electron-beam-assisted EEM method according to the present invention is more advantageous when the workpiece is ZERODUR.

The accelerating voltage of the electron beam is more preferably 1 to 500 kV. Alternatively, the power density of the electron beam is more preferably 10 to 1000 W/cm$^2$.

Effect of the Invention

By the electron-beam-assisted EEM method according to the present invention, it is possible to perform ultrahigh-precision smoothening processing of a workpiece having a mixture of at least two kinds of pulverized component materials different in the processing rate by the processing process above without deterioration in its surface roughness by the following processing process, by modifying the surface layer region of processing face to a processing rate of an almost constant value by electron beam irradiation of the processing face, before an EEM method, comprising a process of allowing fine particles chemically reactive with the workpiece to flow along the processing face of the workpiece and removing the processing-face atoms chemically bound to the fine particles together with the fine particles by chemical interaction at the interface between the fine particles and the processing face.

In particular, glass ceramics, which have a thermal expansion coefficient of almost zero and thus are superior in shape stability, are materials advantageous as optical materials for use, for example, in the ultraviolet ray or X-ray range and also as ultrahigh-precision materials, but one of the principal component materials is crystalline and the other non-crystalline, and thus, such a material has a surface state having both fine crystalline and non-crystalline regions; therefore, it is difficult to achieve the surface roughness of 0.1 nm RMS or less by simple application of the EEM processing process thereto, because the processing rates in the crystalline and non-crystalline regions are different from each other; and, even with such a hardly processable glass ceramic material, it is possible to obtain a processing face having a surface roughness of 0.2 to 0.05 nm RMS in subsequent EEM processing process, by non-crystallizing the surface layer region of the processing face uniformly by electron beam irradiation of the processing face.

Any one of various methods developed and known previously may be used for making the fine particles flow along the processing face. For example, a nozzle-shaped processing head as described in claim 3 or a revolving ball-shaped processing head as described in claim 4 may be used for high-speed flow of the processing liquid containing fine particles dispersed in ultrapure water along the processing face of the workpiece, and the head is used favorably, as properly selected according to the desired processing accuracy in the space wavelength range. In the case of the EEM by vibration as described in claim 5, it is possible to perform mirror-surface processing of a great number of flat plate-shaped workpieces all at once.

In particular when the workpiece is ZERODUR, it is possible to produce ultrahigh-precision optical parts, such as X-ray mirror and EUVL (extreme ultraviolet lithography) spherical mirror, that demand ultrahigh-precision surface. Irradiation optical systems for EUVL demand an extremely strict shape precision of 0.2 nm RMS or less, preferably 0.1 to 0.05 nm RMS, and a favorable surface roughness in a wide spatial frequency range, and these requirements are satisfied by the processing method according to the present invention. The present invention is also applicable to processing of optical materials of glass ceramics other than ZERODUR that have an extremely lower thermal expansion coefficient, if the fine crystals therein can be non-crystallized by electron beam irradiation.

The accelerating voltage and the power density of the electron beam used in the present invention are used actually in transmission electron microscope (TEM) and thus practical. The amorphous region may possibly be crystallized on the contrary, depending on the irradiation condition of the electron beam, and thus, the optimal irradiation condition should be identified in the ranges of the accelerating voltage of 1 to 500 kV and the power density of 10 to 1,000 W/cm$^2$ according to the properties of the workpiece. Uniform conversion of the workpiece surface to single crystal may lead to improvement in surface roughness by the EEM processing, but the surface practically has many microcrystals; and thus, the amorphous surface is generally more preferable than the crystalline surface, because it is difficult to improve the surface roughness to a value of the crystal grain diameter or more and the larger processing rate is higher on the amorphous surface.

BEST MODE FOR CARRYING OUT THE INVENTION

The electron-beam-assisted EEM method according to the present invention is an EEM method, characterized by including a processing process of allowing fine particles chemically reactive with a workpiece to flow along the processing face of the workpiece and removing the processing-face atoms chemically bound to the fine particles together with the fine particles by chemical interaction at the interface between the fine particles and the processing face, wherein: the workpiece comprises a mixture of at least two kinds of pulverized component materials different in the processing rate by the processing process above from each other; and the processing face of the workpiece is irradiated with electron beam to be modified such that the processing rate is almost uniform on the surface layer region of the processing face and then superfine-smoothened by the processing process. A typical example of the workpiece is ZERODUR.

ZERODUR®, a product name of SCHOTT AG, Germany, is a material superior in heat shock resistance having a thermal expansion coefficient of close to zero. More specifically, ZERODUR is characteristic in that the thermal expansion coefficient is extremely small at room temperature, belongs to glass-ceramic composite materials and contains both non-crystalline (amorphous) and crystalline compositions. ZERODUR is a material, approximately 75% of the glass material of which is crystallized into quartz by a special temperature-cycle processing in its production step, that is fairly transparent apparently, because the crystals are very fine at about 50 nm in size and the difference in refractive index between the non-crystalline and crystalline regions is small, but it is not suitable as a transmission optical part, because the light scattering by the microcrystals is significant. The thermal expansion coefficient of the non-crystalline phase is positive, while the thermal expansion coefficient of the crystalline phase is negative at room temperature, and the two-phase averaged thermal expansion coefficient of the entire ZERODUR is almost zero in the practically usable temperature range. Physical properties of ZERODUR are shown in Table 1.

TABLE 1

Physical properties of ZERODUR

| | |
|---|---|
| Refractive index | 1.542nd |
| Density (25° C.) | 2.53 g/cm$^3$ |
| Young's modulus | 9.1 × 10$^9$ dyn/mm$^2$ |
| Poisson's ratio | 0.24 |
| Specific heat (25° C.) | 0.196 cal/g ° C. |
| Linear thermal expansion coefficient (20° C. to 300° C.) | (0.05 ± 0.10) × 10$^{-6}$/° C. |
| Abbe number | Vd = 66 |
| Dispersion | (nf-nc) = 0.00967 |
| Maximum temperature | 600° C. |

The accelerating voltage of the electron beam irradiated on the workpiece is preferably 1 to 500 kV. An electron beam-accelerating voltage of less than 1 kV unfavorably leads to deterioration in efficiency, specifically to difficulty in converting crystalline region to non-crystalline region or elongation of irradiation period, while an accelerating voltage of more than 500 kV, to a concern about the damage of the workpiece in the deeper layer by the high-speed electron beam generated and uneconomically to expansion in scale of the electron beam irradiation apparatus used. Alternatively, an electron beam power density of less than 10 W/cm$^2$ leads to elongation of the irradiation period, while a power density of more than 1000 W/cm$^2$, to a concern about the surface damage of the workpiece and uneconomically to expansion of the electron beam irradiation apparatus used. Accordingly, the optimal electron beam irradiation condition for crystalline to non-crystalline conversion is determined according to the properties of the workpiece, in the following ranges: accelerating voltage in the range of 1 to 500 kV and power density in the range of 10 to 1000 W/cm$^2$. The depth of the electron beam penetrating into a material can be calculated roughly from the accelerating voltage and the density of the material. For example, the penetration depth into quartz (density: 2.65 g/cm$^3$) is approximately 25 nm when the accelerating voltage of electron beam is 1 kV, approximately 1.2 μm when it is 10 kV, and approximately 55 μm when it is 100 kV. The conversion may be performed only on the surface layer region in the present invention, and thus, the accelerating voltage of electron beam is more preferably in the range of 10 to 100 kV. In the case of Si single crystal having a density of 2.336 g/cm$^3$, the electron penetration depth is slightly larger than that of quartz at the same accelerating voltage.

For observation of a sample under transmission electron microscope (TEM), a thin sample thereof allowing transmission of electron should be prepared. First, a ZERODUR block of several mm square is cut into thin plates with a diamond cutter, and the thin plate is then ground to a thickness of approximately 200 μm with a file. The thin film is then punched into a circular disc having a diameter of approximately 3 mm by ultrasonic machining. The circular disc is polished with a small polishing machine to make the thickness in the central region approximately 30 μm and forming a hole partially in the central region by ion thinning, to give a sample for observation.

By bright-field observation under transmission electron microscope at an accelerating voltage of 200 kV, the edge of the sample hole is observed. FIG. 1(a) shows a TEM image (×20,000) immediately after initiation of scanning, and FIG. 1(b) shows another TEM image (×50,000) immediately after initiation of scanning. FIG. 2 is another TEM image (×20,000) approximately 1 minute after initiation of scanning. FIG. 1 shows that ZERODUR has a number of white spots and that the surface state is irregular. FIG. 2 shows that the white spots on the ZERODUR surface disappear by electron beam irradiation and that the surface is uniform. In FIGS. 1(a) and 2, increase in density of the background color from left to right reflects the gradual increase in thickness of the sample from left to right. The electron diffraction pattern of the white spot region in FIG. 1 is shown in FIG. 3(a); while the electron diffraction pattern of the region other than the white spot region in FIG. 3(b).

The electron diffraction pattern shown in FIG. 3(a) has a ring distinctively indicating crystallinity, showing that the white spot region is crystalline. On the other hand, the electron diffraction pattern in FIG. 3(b) has a halo indicating amorphousness, showing that the region other than the white spot region is non-crystalline. The surface state of ZERODUR after electron beam irradiation for 1 minute shown in FIG. 2 is found to be non-crystalline. FIG. 4 is a characteristic X-ray spectrum obtained when the electron beam diameter is 60 nm. Sharp peaks of Si and Al are observed, indicating that these are the principal component elements of ZERODUR. In addition, peaks of P, Ca, Na, Zn, Cu, Ti, K, and others are observed.

The spacing of the lattice planes forming the diffraction pattern is calculated from the diameter of the ring in the electron diffraction pattern shown in FIG. 3(a) and the most probable candidates thereof are selected from database, which is shown in Table 2.

TABLE 2

Analysis of interval of crystal lattice face

| Lattice face intervals calculated from the diameter of the ring in diffraction pattern (Å) |
| --- |
| *4.47 |
| *3.39 |
| *2.31 |
| 2.21 |
| 2.04 |
| *1.84 |
| 1.70 |
| *1.59 |

Among the intervals above, diffraction patterns corresponding to the intervals of 3.39, 1.84, and 4.47 are very strong. The crystal lattice face intervals indicated by * in Table 2 including the crystal lattice face intervals corresponding to the high-intensity diffraction patterns agrees well with the crystal lattice face intervals observed with monoclinic $SiO_2$.

It was found that, when the electron beam for observation under transmission electron microscope is first irradiated on ZERODUR, there were definitely countless crystals of 50 nm or less in size, but the crystals disappear, converting themselves into the non-crystalline state within 1 minute when the electron beam was irradiated continuously. The results demonstrated that the surface layer region of ZERODUR having a thickness of at least about 30 μm is converted into the non-crystalline state uniformly by electron beam irradiation. The depth of the electron penetrating into the workpiece varies according to the accelerating voltage of electron beam, and a smaller accelerating voltage leads to non-crystalline conversion only of a very shallow surface layer region, while a larger accelerating voltage to non-crystalline conversion to further depth. It is preferably to make the thickness of the non-crystallized surface layer region as low as possible, according to the amount to be removed in the following EEM processing, for minimization of the influence on the physical properties of the workpiece.

The workpiece according to the present invention is a glass ceramic containing one crystalline principal constituent material and the other non-crystalline constituent material, and ULE® (Corning), CLEARCERAM-Z® (Ohara), KERALITE® (Eurokera), and the like may be processed similarly, in addition to the ZERODUR above.

Subsequently, micro irregularities on the uniformly surface-noncrystallized workpiece (ZERODUR) by electron beam irradiation in the step above are removed by EEM. There are several methods of allowing fine particles chemically reactive with the surface atoms on the workpiece to flow along the processing face during EEM. Typical processing methods by EEM will be described below, with reference to the embodiments in the attached drawings.

[EEM by Nozzle-Shaped Processing Head]

First, the EEM by using a nozzle-shaped processing head will be described with reference to FIG. 5. A processing nozzle 1 and a workpiece 2 are immersed in ultrapure water in a processing tank; A slit-shaped ejection port 3 of the processing nozzle 1 is placed at a position in parallel with a processing face 4 of the workpiece 2 with its ejection direction tilted to the processing face 4; and for progress of processing, a processing liquid 6 containing uniformly dispersed fine particles 5 chemically reactive with the surface atoms of workpiece 2 is ejected through the processing nozzle 1 in ultrapure water, generating high-speed shear stream of the processing liquid 6 along the processing face 4 and removing processing-face atoms by removing the fine particles 5 chemically bound to the processing-face atoms by the high-speed shear stream. The processing is performed by making the processing nozzle 1 scan on the processing face 4 while adjusting the residence time of the processing nozzle 1 according to the processing amount calculated by subtracting the desired profile from the pre-processing profile previously determined.

The fine particles 5 may be mixed with the ultrapure water in the processing tank. If only ultrapure water is ejected from the processing nozzle 1, the processing liquid may be supplied from another inlet, together with the ultrapure water stream. Alternatively, it is also possible to generate particular shear stream along the processing face 4 of the workpiece 2 similarly, by placing a processing liquid containing fine particles dispersed in ultrapure water previously in the processing tank and injecting ultrapure water from the processing nozzle 1 into the processing liquid. However in practice, it is most effective in processability to eject the processing liquid 6 from the processing nozzle 1.

In addition, it is possible to use fine particles 5 having an average diameter of 10 nm to 10 μm during the EEM by nozzle-shaped processing head. However, the upper limit is preferably about several μm in practice, because excessive increase of the diameter of the fine particles results in generation of scratches by contact of the fine particles 5 with the processing face 4, and the lower limit is preferably about 0.1 μm in practice, because excessive decrease in particle diameter demands significant increase in the flow rate of the shear stream for removal of the fine particles 5 deposited on the processing face 4.

It is possible then to raise the processing rate by several hundred times, by using aggregated fine particles, aggregates of multiple different fine particles, although with some increase in surface roughness. The extreme increase in processing rate reflects the fact that the aggregated fine particles have a very large surface area and many projections binding to the surface atoms. Aggregate having an average diameter of 0.5 to 5 μm consisting of fine particles having a primary diameter of 1 to 100 nm is used as the aggregated fine particles. Specifically, the aggregated fine particles above is the aggregate having an average diameter of approximately 2 μm that is prepared by heated aggregation of $SiO_2$ fine particles having a particle diameter of 0.1 μm or less, practically of several dozens nm. The concentration of the aggregated fine particles in the processing liquid is preferably 3 to 7 vol %.

It is possible to perform high-precision processing in a shorter period of time, by high-speed processing by using aggregated fine particles and finish processing by using common fine particles. It is possible to change easily from high speed processing to finish processing by using aggregated fine particles, simply by changing the processing liquid.

[EEM by Revolving Ball-Shaped Processing Head]

Hereinafter, EEM by using a revolving ball-shaped processing head will be described with reference to FIGS. 6 to 8. An elastic rotor 11 and a workpiece 12 are placed in a processing tank containing a processing liquid containing uniformly dispersed fine particles; the processing liquid is incorporated into and allowed to flow through the space between the elastic rotor 11 and the processing face 13, while the elastic rotor 11 is rotated under a certain load F as it is pressed to the processing face 13 of the workpiece 12; and the processing is performed, while a constant distance thereof is preserved by adjustment of the balance between the load and the dynamic fluid pressure generated by flow of the processing liquid. The elastic rotor 11 of a polyurethane ball is connected to the terminal of a rotating shaft 15 of a processing motor 14. The elastic rotor 11 scans the workpiece 12 three-dimensionally, as it is numerically controlled.

As shown in FIGS. 7 and 8, when the elastic rotor 11 is rotated as it is pressed to the processing face 13 at a constant load F in a particular direction, the processing liquid is forced to flow into the space between the elastic rotor 11 and the processing face 13, causing local processing-liquid stream flowing in the direction along the processing face 13; the elastic rotor 11 and the processing face 13 held separated by an opening of about 1 μm in thickness, by the dynamic fluid pressure generated between the elastic rotor 11 and the processing face 13; fine particles 16 in the processing liquid pass through the opening between the processing face 13 and the elastic rotor 11 in the processing-liquid stream, as they are brought in contact with the processing face 13 and process the processing face 13 by chemical interaction at the interface between the processing face 13 and the fine particles 16.

For continuous processing of a larger processing area 13, the elastic rotor 11 is driven to scan the workpiece 12. Alternatively, a cylindrical rotor may be used as the elastic rotor 11.

In the EEM by using a revolving ball-shaped processing head in the present embodiment, it is quite important, for non-contact processing, to form and hold an opening of about 1 μm in thickness between the elastic rotor 11 and the processing face 13. For that reason, the particle diameter of the fine particles 16 for use should be sufficiently smaller than the width of the opening. Thus, the aggregated fine particles used in the EEM by using a nozzle-shaped processing head are not used favorably, because the particles are larger in particle diameter and wider in particle diameter distribution. Normally, fine particles having a particle diameter of about 0.1 μm are used for processing.

[EEM by Vibration]

Finally, EEM by vibration will be described with reference to FIGS. 9 to 11. In contrast to the wet processing by the EEM by using a nozzle-shaped processing head or revolving ball-shaped processing head described above, the EEM by vibration is a dry process. However, it is not a completely dry process and uses moisturized fine particles. The EEM machine by vibration has a structure in which a platen 31 having a large inertia mass is placed horizontally with as floated on multiple vibration absorbers 33 . . . installed concentrically on the bottom installation plate 32, and a vibrator 35 is vibrated by eccentric rotation of a drive motor 34 connected to the platen 31 for vibration of a processing container K placed and fixed on the vibrator 35. A workpiece W is held in the processing container K with its processing face in the horizontal direction and water molecule-absorbed fine particles are housed in the processing container K and placed on the processing face; and vibration of the processing container K and the resulting flowing contact of the fine particles with the processing face of the workpiece W result in mirror-surface processing by interaction at the interface between the fine particles and the processing face.

More specifically, the EEM machine by vibration has a structure, in which: the platen 31 having a ring-shaped weight 37 connected to the periphery of a base plate 36 circular in shape as seen from the top is held in the floating state horizontally, as supported by a vibration absorber 33, . . . placed immediately below the weight 37; a bearing hole 38 is formed through the base plate 36 with its axis line identical with the vertical line at the center of gravity of the platen 31; the drive motor 34 is installed under the center of the base plate 36 with its drive shaft 39 rotatably connected to the bearing hole 38; multiple follower shafts 40, . . . are rotatably connected to the base plate 36 around the drive shaft 39 in the same rotation attitude with that of the drive shaft 39; a circular plate-shaped vibrator 35 is placed horizontally on the base plate 36 with the gravity center of the vibrator 35 rotatably supported by an eccentric drive shaft 41 formed on the top of the drive shaft 39; and the periphery of the vibrator 35 is rotatably connected to the eccentric drive shaft 41 with the eccentric follower shafts 42 formed atop the follower shafts 40, . . . .

Air springs, which are used as the vibration absorbers 33, are installed on the installation plate 32; and additionally, multiple support rods 43, . . . supporting the platen 31 when the air spring is not in operation are formed on the installation plate 32. Compressed air is supplied from an air pump 44 to the air springs 33 through multiple pressure hoses 45, . . . , to support the platen 31 in the floating state.

It is possible to restrict vertical vibration of the platen 31 and the vibrator 35 by placing the vibrator 35 in the space surrounded by the base plate 36 and the ring-shaped weight 37 and setting the vertical position of the vibrator 35 to the area close to the gravity center of the platen 31. It is also possible to prevent unexpected vibration of the vibrator 35 by making the ratio by weight of the platen 31 to the vibrator 35 larger by 100 times or more and restricting vibration of the platen 31.

Rotation of the drive shaft 39 results in eccentric rotation of the eccentric drive shaft 41, and subsequent synchronous eccentric rotation of the eccentric follower shafts 42, . . . leads to horizontal vibration of the vibrator 35. It is thus possible to vibrate a processing container K similarly, independently of where it is located on the top face of the vibrator 35. The rotational frequency of the drive shaft 39 (vibration cycle of vibrator 35) is preferably in the range of 500 to 2,000 rpm. Because the processing rate varies according to the material of the workpiece, fine particles having the most favorable surface physical properties should be used according to the workpiece. For example, when the workpiece is silicon wafer, use of $SiO_2$ or $ZrO_2$ having an average diameter of 1 μm to 10 μm is preferable. The fine particles described above may not have uniform physical properties inside and thus, may be particles prepared by coating a material having desirable physical properties on the surface of core fine particles relatively uniform in particle size and readily available such as $Al_2O_3$ and $GeO_2$. In the machine in the present embodiment, the maximum vibration width of the top face of the vibrator 35 in the vertical direction is 15 μm or less at a rotation frequency of 1,800 rpm.

The water molecule-adsorbed fine particles for use is prepared by placing the $SiO_2$ powder described above in a container with an open top face and placing the container under saturated steam of ultrapure water in a tightly sealed container for 12 to 24 hours, allowing the $SiO_2$ powder to absorb water molecules. During the processing, the processing container K is tightly sealed for prevention of drying of the $SiO_2$ powder. Use of dry $SiO_2$ powder is known to be almost ineffective in surface processing of Si wafers.

BRIEF DESCRIPTION OF THE DRAWINGS

FIG. 1 shows the results of bright-field observation of ZERODUR under a transmission electron microscope: (a) a × 20,000 TEM image immediately after initiation of scanning; and (b) a ×50,000 TEM image immediately after initiation of scanning.

FIG. 2 shows the result of bright-field observation of ZERODUR under a transmission electron microscope: a ×20, 000 TEM image, 1 minute after initiation of scanning.

FIG. 3(a) shows the diffraction pattern of the white spot region in FIG. 1, and FIG. 3(b) shows the diffraction pattern of the area other than the white spot region in FIG. 1.

FIG. 4 is a characteristic X-ray spectrum of ZERODUR.

FIG. 5(a) is a conceptual view of the EEM by using a nozzle-shaped processing head, and FIG. 5(b) is an enlarged sectional explanatory view illustrating the region A in FIG. 5(a).

FIG. 6 is a schematic view illustrating the EEM by using a revolving ball-shaped processing head.

FIG. 7 is a schematic explanatory view illustrating the relationship between an elastic rotor and the processing face of a workpiece and thus, showing the processing principle.

FIG. 8 is a partially magnified view of FIG. 7.

FIG. 9 is an entire perspective view illustrating an EEM machine by vibration.

FIG. 10 is a vertical cross-sectional view of the main region.

FIG. 11 is a schematic top view illustrating the locus of the vibrator.

EXPLANATION OF REFERENCES

| | |
|---|---|
| 1 | Processing nozzle |
| 2 | Workpiece |
| 3 | Ejection port |
| 4 | Processing face |
| 5 | Fine particles |
| 6 | Processing liquid |
| 11 | Elastic rotor |
| 12 | Workpiece |
| 13 | Processing face |
| 14 | Processing motor |
| 15 | Rotating shaft |
| 16 | Fine particles |
| 31 | Platen |
| 32 | Installation plate |
| 33 | Vibration absorber |
| 34 | Drive motor |
| 35 | Vibrator |
| 36 | Base plate |
| 37 | Weight |
| 38 | Bearing hole |
| 39 | Drive shaft |
| 40 | Follower shaft |
| 41 | Eccentric drive shaft |
| 42 | Eccentric follower shaft |
| 43 | Support rod |
| 44 | Air pump |
| 45 | Pressure hose |
| K | Processing container |
| W | Workpiece |

The invention claimed is:

1. An ultra precision elastic emission machining (EEM) method comprising:

providing a workpiece with a surface to be machined, the workpiece surface to be machined comprises a mixture of at least two kinds of component materials having different respective EEM machining rates;

before performing EEM, irradiating the surface of the workpiece to be machined with an electron beam, whereby the irradiating step modifies the machining rates of the two components of the workpiece surface to be machined such that the machining rates of the components become almost uniform on the surface of the workpiece and surface smoothness is increased during the EEM step;

performing EEM by machining the irradiated surface of the workpiece by flowing chemically reactive fine particles along the surface of the workpiece thereby removing machined-face atoms of the workpiece that are chemically bonded to the fine particles along with the fine particles to smoothen the surface of the workpiece.

2. The method according to claim 1, wherein the workpiece is a glass ceramic including one crystalline principal constituent material and another non-crystalline principal constituent material, and the machined surface of the workpiece is made uniformly non-crystallized uniformly by the electron beam irradiation, whereby the machined surface acquires a surface roughness of 0.2 to 0.05 nm RMS.

3. The method according to claim 2, comprising flowing a processing liquid containing the fine particles dispersed in ultrapure water at high speed along the machined surface of the workpiece.

4. The method according to claim 3, comprising generating a high-speed shear stream of the processing liquid along an area close to the machined surface by ejecting the processing liquid through a processing nozzle from a tilted direction in liquid on the machined surface of the workpiece, the machined surface being immersed in ultrapure water or the processing liquid, and removing the machined-face atoms by removing the fine particles chemically bound to the machined-face atoms in the high-speed shear stream.

5. The method according to claim 3, comprising placing the workpiece and an elastic rotor in the processing liquid, incorporating the processing liquid into a space between the elastic rotor and the processing machined surface, and allowing the processing liquid to flow through the space by rotating the elastic rotor while pressing the elastic rotor on the machined surface of the workpiece at a particular load, and preserving a particular gap by control of a balance between the load and the dynamic fluid pressure generated by a flow of the processing liquid.

6. The method according to claim 2, comprising placing the workpiece with its machined surface held horizontally in a processing container, housing water molecule-adsorbed fine particles in the processing container, placing the fine particles on the machined surface, allowing the fine particles to flow on and come in contact with the machined surface of the workpiece, and vibrating the processing container two-dimensionally in the horizontal plane, and thus advancing mirror-surface processing by interaction at the interface between the fine particles and the machined surface.

7. The method according to claim 1, wherein the workpiece is ZERODUR®.

8. The method according to claim 1, wherein the accelerating voltage of the electron beam is 1 to 500 kV.

9. The method according to claim 8, wherein the power density of the electron beam is 10 to 1000 W/cm².

10. The method according to claim 1, comprising flowing a processing liquid containing fine particles dispersed in ultrapure water at high speed along the machined surface of the workpiece.

11. The method according to claim 10, comprising generating a high-speed shear stream of the processing liquid along an area close to the machined surface by ejecting the processing liquid through a processing nozzle from a tilted direction in liquid on the machined surface of the workpiece, the machined surface being immersed in ultrapure water or the processing liquid and removing the machined-face atoms by removing the fine particles chemically bound to the machined-face atoms in the high-speed shear stream.

12. The method according to claim 10, comprising placing the workpiece and an elastic rotor in the processing liquid, incorporating the processing liquid into a space between the elastic rotor and the machined surface, and allowing the processing liquid to flow through the space by rotating the elastic rotor while pressing the elastic rotor on the machined surface of the workpiece at a particular load, and preserving a particular gap by control of a balance between the load and the dynamic fluid pressure generated by a flow of the processing liquid.

13. The method according to claim 1, comprising placing the workpiece with its machined surface held horizontally in a processing container, housing water molecule-adsorbed fine particles in the processing container placing the fine particles on the machined surface, allowing the fine particles to flow on and come in contact with the machined surface of the workpiece, and vibrating the processing container two-dimensionally in the horizontal plane, and thus advancing mirror-surface processing by interaction at the interface between the fine particles and the machined surface.

14. The method according to claim 2, wherein the workpiece is ZERODUR®.

15. The method according to claim 3, wherein the workpiece is ZERODUR®.

16. The method according to claim 2, wherein the accelerating voltage of the electron beam is 1 to 500 kV.

17. The method according to claim 16, wherein the power density of the electron beam is 10 to 1000 W/cm$^2$.

18. The method according to claim 3, wherein the accelerating voltage of the electron beam is 1 to 500 kV.

19. The method according to claim 18, wherein the power density of the electron beam is 10 to 1000 W/cm$^2$.

20. The method according to claim 13, wherein the accelerating voltage of the electron beam is 1 to 500 kV.

* * * * *